(12) United States Patent
Afghahi et al.

(10) Patent No.: US 6,717,616 B1
(45) Date of Patent: Apr. 6, 2004

(54) AMPLIFIER ASSISTED ACTIVE PIXEL READ OUT STRUCTURE

(75) Inventors: Morteza Afghahi, Tempe, AZ (US); Khalil Waleed, Tempe, AZ (US); Issa Sami, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/374,815

(22) Filed: Aug. 16, 1999

(51) Int. Cl.[7] .......................... H04N 5/235; H04N 3/14; H04N 5/335
(52) U.S. Cl. .................. 348/300; 348/301; 348/294; 348/230.1
(58) Field of Search ................. 348/300, 301, 348/230.1, 294

(56) References Cited

U.S. PATENT DOCUMENTS

| 5,461,425 A | * | 10/1995 | Fowler et al. ............... 348/294 |
| 5,493,423 A | * | 2/1996 | Hosier ........................ 358/482 |
| 5,539,196 A | * | 7/1996 | Miyawaki et al. ........ 250/208.1 |
| 5,654,537 A | * | 8/1997 | Prater ...................... 250/208.1 |
| 5,717,458 A | * | 2/1998 | Yonemoto .................... 348/305 |
| 5,900,623 A | * | 5/1999 | Tsang et al. ............. 250/208.1 |
| 5,917,547 A | * | 6/1999 | Merrill et al. ............... 348/301 |
| 6,084,229 A | * | 7/2000 | Pace et al. ................ 250/208.1 |
| 6,130,423 A | * | 10/2000 | Brehmer et al. ......... 250/208.1 |
| 6,166,768 A | * | 12/2000 | Fossum et al. ............. 348/308 |

* cited by examiner

Primary Examiner—Andrew Christensen
Assistant Examiner—Brian Genco
(74) Attorney, Agent, or Firm—Blakely, Sokoloff, Taylor & Zafman LLP

(57) ABSTRACT

A read out circuit for an active pixel sensor array is provided. The read out circuit includes an amplifier that has a first and second input devices and an output port. The first input device is included in a pixel of an active pixel sensor array to receive an input signal indicative of an intensity of light detected by the pixel. The amplifier generates at an output thereof an output signal proportional to the input signal.

23 Claims, 4 Drawing Sheets

AMPLIFIER ASSISTED ACTIVE PIXEL READ OUT STRUCTURE

BACKGROUND OF THE INVENTION

I. Field of the Invention

The present invention relates to imaging devices. In particular, the present invention relates to devices that detect and provide a measure of an intensity of light impinging on imaging pixel devices.

II. Background Information

Imaging arrays, used to produce an image representing an object, are typically formed of rows and columns (bitlines) of photo detectors (pixels). The pixels generate photo charges proportional to light reflected from an object to be imaged. Photo charges from each pixel are converted to a signal (charge signal) or potential representative of a level of energy reflected from a respective portion of the object. The signal or potential is read and processed by video processing circuitry to create an image representing an object.

Pixels belongings to a same bitline are usually connected at a common output node from where a signal or potential, representative of the level of energy, is read out. Pixels belonging to the same bitline "see" an overall capacitance (hereinafter referred to as "bitline capacitance"), at the common output node. Each pixel in a same bitline is individually controlled to read out at the common output node. Typically, pixels belonging to a same row are commonly controlled by a same signal (wordline) such that an entire row may be read out at a substantially same time.

To meet the increasing need for high speed image sensor devices, image sensor arrays are integrated with digital circuitry that controls the operation of the array and processes the array's output. Integration of image sensors with complementary-metal-oxide-semiconductor (CMOS) support circuitry is most desirable because of the low power consumption characteristics and common availability of CMOS technology. Such an imaging array integrated with CMOS support circuitry is called CMOS active pixel sensor (APS) array.

Typically, a pixel includes a photosensor that detects light impinging thereon and "converts" the light into an electronic signal indicative of an intensity of light detected by the pixel. A driving device receives the electronic signal and drives a current proportional to the electronic signal to a bitline to which the pixel is coupled. Then the pixels in a selected row are accessed by asserting the WORDLINE signal to each pixel access device of each pixel cell of a selected row. Then each bitline to which a corresponding pixel of the selected row is coupled, may be charged by a current driven by the driving device of the pixel to a voltage level representative of an intensity of light detected by that pixel. The pixels of an entire row may thus be read out at a substantially same time. The pixel cells of other rows, not currently accessed, have their pixel access devices switched off by deasserting the wordline signals corresponding to these rows.

One problem with conventional read out circuits is that the read out signal at the output of the read out circuit is not linear with the input signal which reflects the intensity of the light impinging on a pixel. The non-linearity of such read out circuits negatively affects the accuracy of the image read out by these circuits. The lack of linearity is mainly due to the body effect that affects conventional read out circuits that use source follower schemes. The body effect is a well-known principle in Metal Oxide Semiconductor Field Effect Transistors (MOSFET)—the threshold voltage of a MOSFET varies in accordance with variations in the source-to-bulk voltage of such transistor. In a source follower circuit, such as the one implemented in conventional read out circuits, this effect causes non-linearity in the output voltage $V_{out}$, as $V_{out}=V_{in}-V_{th}$, and the threshold voltage $V_{th}$ varies with the output voltage $V_{out}$. Furthermore, read out circuits that use source follower circuits generate at their output voltages $V_{out}$ that are lower in value than the input voltages $V_{in}$ due to the threshold voltage of the transistors employed by these circuits.

SUMMARY OF THE INVENTION

Briefly, one embodiment of the present invention includes a read out circuit. The read out circuit includes an amplifier that has a first and second input devices and an output port. The first input device is included in a pixel of an active pixel sensor array to receive an input signal indicative of an intensity of light detected by the pixel. The amplifier generates at an output thereof an output signal proportional to the input signal.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Briefly, one embodiment of the present invention includes a read out circuit. The read out circuit includes an amplifier that has first and second input devices and an output port. This amplifier has a gain that is larger than the unit as opposed to the source follower that has a gain of approximately 0.7 volts. The first input device is included in a pixel of an active pixel sensor array to receive an input signal indicative of an intensity of light detected by the pixel. The amplifier generates at an output thereof a substantially linear output signal, proportional to the input signal.

Figure 1:
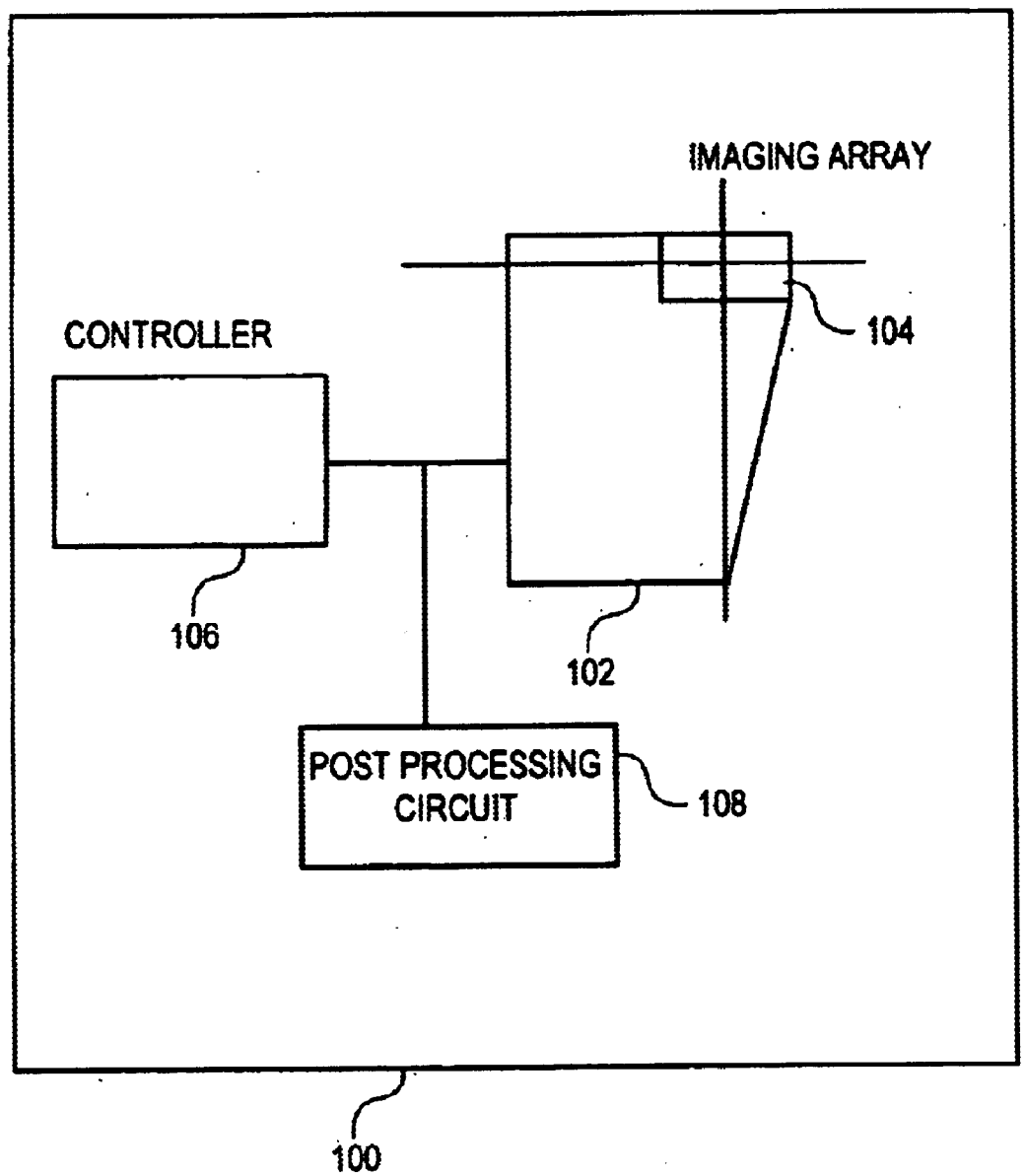
FIG. 1 illustrates an imaging system that has a read out circuit according to an embodiment of the present invention.

The embodiment of the read out circuit may be utilized in connection with an imaging system illustrated in FIG. 1. One such imaging system 100 may be a digital camera, a video system, etc. The imaging system 100 includes a CMOS active pixel sensor array (hereinafter referred to as "imaging array") 102 that includes a plurality of active pixel cells 104 with read out circuits 104 according to the present invention. The imaging system 100 also includes controller device 106 that controls among other things, the active pixel cells 104 with the read out circuits according to the present invention. A post processing circuit 108 is coupled to the controller device and to the imaging array. Such post processing circuit may include an analog-to-digital converter that converts the analog signal at the output of a read out circuit to a digital signal.

Figure 2:
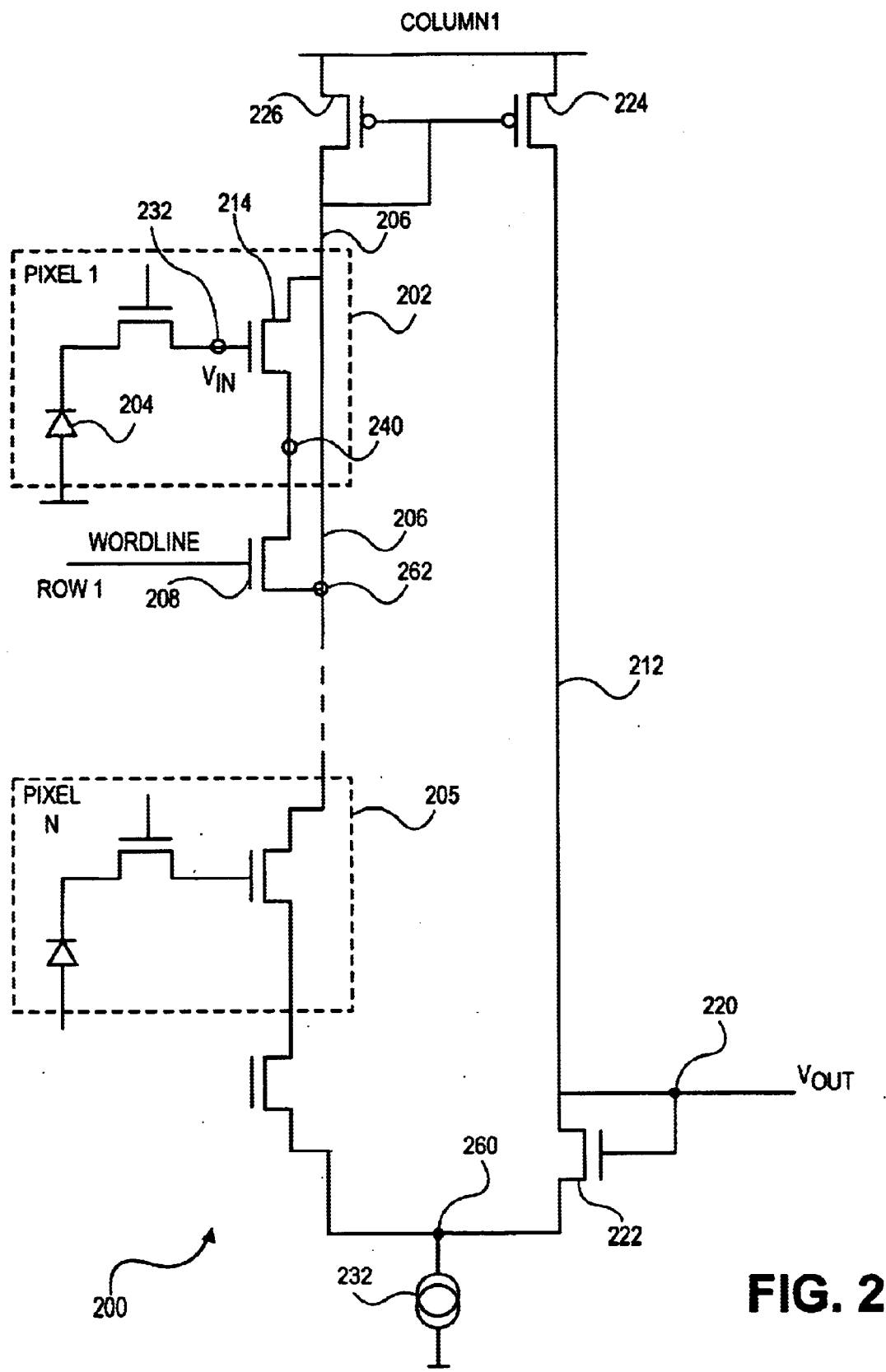
FIG. 2 illustrates an embodiment of a read out circuit according to of the present invention.

FIG. 2 illustrates an embodiment of a read out circuit 200 according to the present invention. The read out circuit 200 is configured to read out information indicative of an intensity of light detected by any of the pixels of a CMOS active pixel sensor array. The array typically includes a plurality of rows and columns (bit lines). Each row includes one pixel 202 for each bit line, such as bit line 206, of the array. In one embodiment of the read out circuit of the present invention, each pixel cell of the same row may be accessed and read out at a substantially same time by asserting a read enable signal (hereinafter referred to as "wordline") signal to a pixel select device 208. The wordline signal is routed through the array to each pixel select device corresponding to a pixel of the same row. The rows of the array are typically read out one by one after the wordline signal is asserted to a respective row. The information read out typically includes an electrical charge or a voltage difference that is proportional to an intensity of a light impinging on photodiode 204 of pixel cell 202.

In the following discussion, we will discuss the operation of the read out circuit 200 in connection with pixel cell 202, being understood that the following discussion also applies to the other pixels of the array. The read out circuit 200 includes an amplifier 212. Amplifier 212, in one embodiment, has a differential pair made up of a first and second input active devices 214 and 222 and a pair of transistors 224 and 226 coupled in a current mirror configuration. The first input active device 214 is a device that is included in pixel 202 being an integral part of the structure of the pixel of the array. However, it should be understood, that the embodiment of the read out circuit according to the present invention may be also implemented with the first input active device 214 of the amplifier 212 located outside the pixel 202.

In one embodiment, first and second input active devices 214 and 222 are implemented by way of N-Metal Oxide Semiconductor Field Effects Transistors (MOSFET). Transistor 214 is coupled to pixel select device 208. Pixel select device 208 has a gate thereof coupled to the wordline signal. When the wordline signal is asserted, pixel 202 is selected for read out. The pixel select device 208 acts as a pass gate substantially "passing" the voltage at the source of transistor 214 to the node 262. Bitline 206 has other pixel cells, such as pixel cell 205, coupled thereto. Bitline 206 is coupled at s node 260 thereof to a current source 232 and to second active device 222 of the amplifier 212. In the embodiment according to the present invention described herein, transistor 222 has a gate thereof coupled to a drain thereof, which is coupled to output node 220.

Amplifier 212 is configured as a voltage follower. Due to the voltage follower configuration, the voltage at output node 220 is substantially equal to the input voltage at the gate of transistor 214. The output voltage represents the input voltage more accurately then in traditional read out circuits. This voltage reflects the intensity of the light detected by pixel 202. The read out circuit including amplifier 212 provides a substantially linear output voltage proportional to the input voltage. The read out circuit 200 with the amplifier 212 overcomes the problems associated with the conventional source follower read out schemes where the voltage at the output node is reduced due to the threshold voltage and is nonlinear due to the body effect. The read out circuit also has a substantially strong drive.

Figure 3:
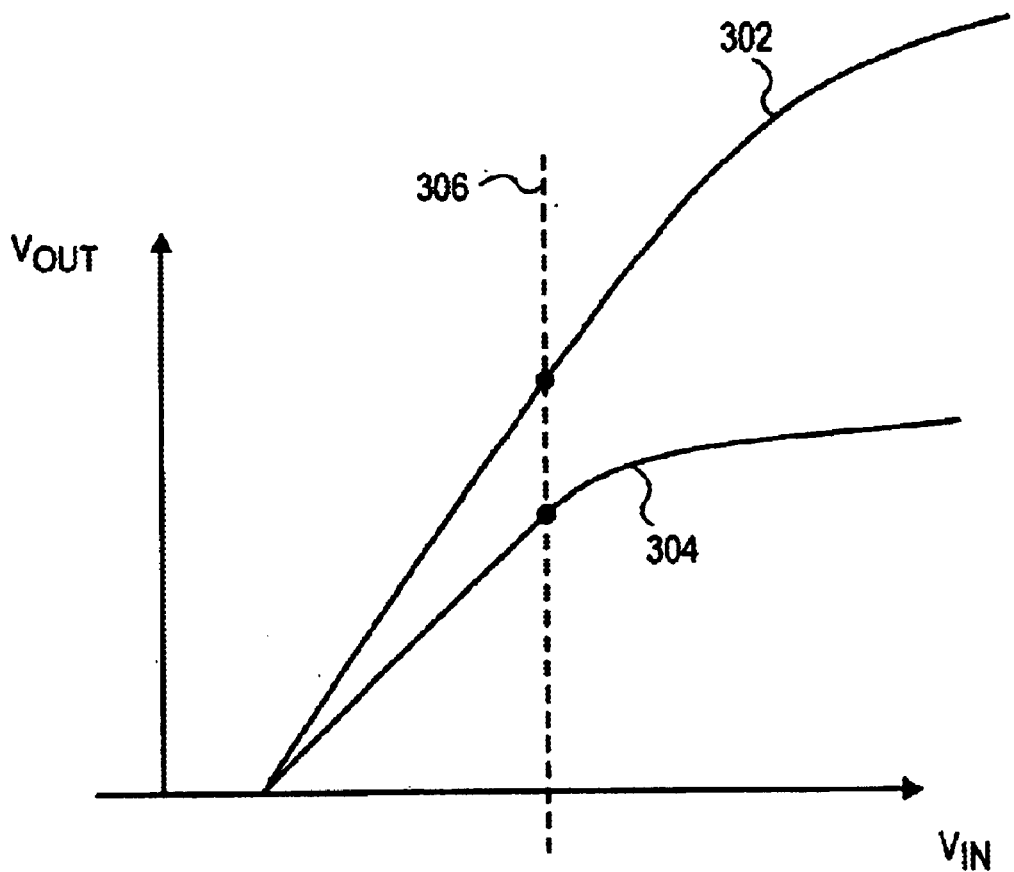
FIG. 3 illustrates diagrams of the output voltage versus the input voltage for one embodiment of the read out circuit according to the present invention and for a conventional read out circuit.

FIG. 3 illustrates a diagram of the output voltage $V_{out}$ versus the input voltage $V_{in}$. Waveform 302 represents the output voltage of the differential amplifier. As one may see, waveform 302 is substantially linear for the pixel's dynamic range (defined by dotted line 306). Diagram 304 represents the output voltage versus the input voltage for a conventional read out circuit that is non-linear. Note the output voltage's higher linearity across the dynamic range for waveform 30.

Figure 4:
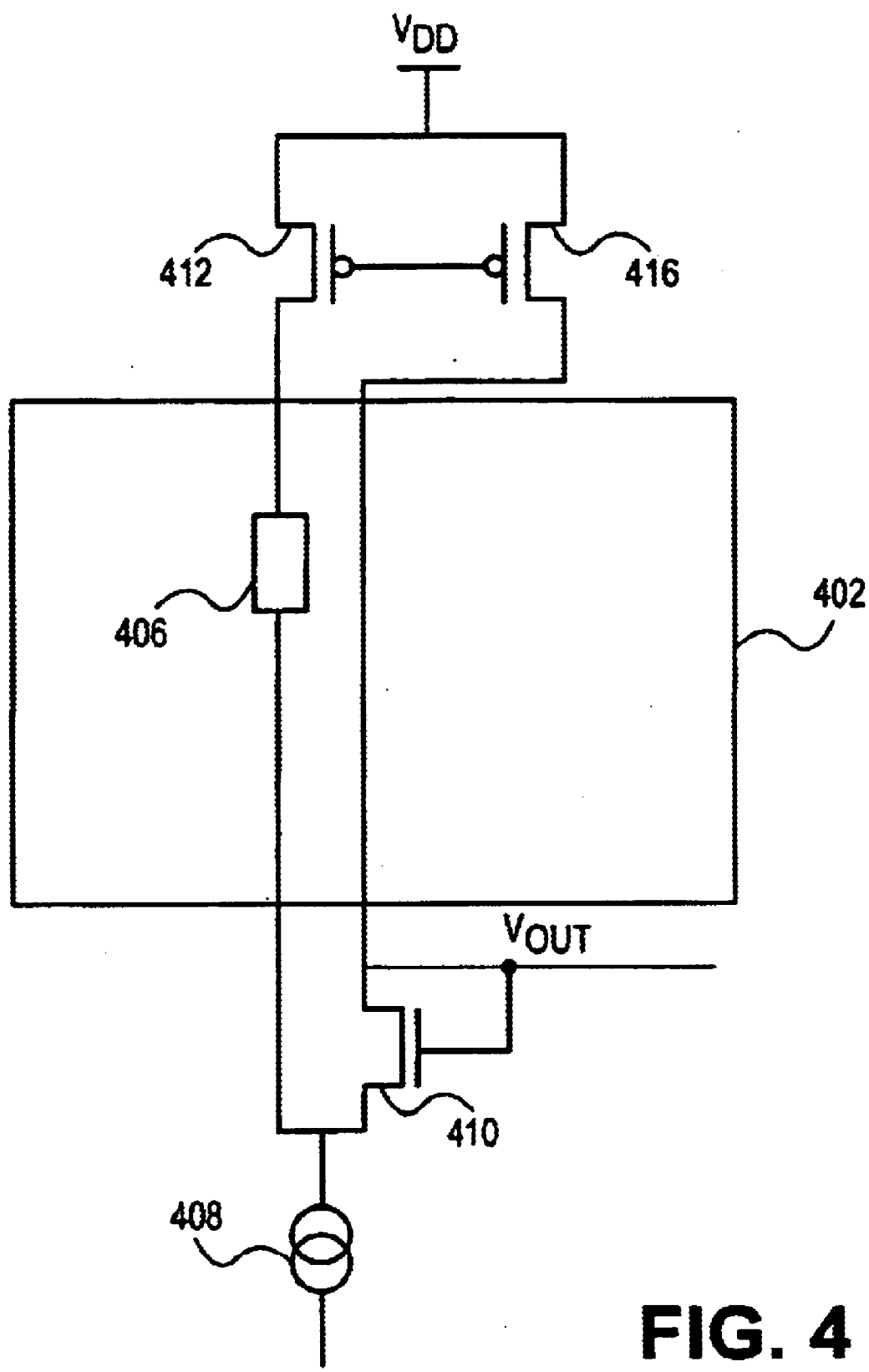
FIG. 4 is a diagram of an array of pixels that incorporates the read out circuit according to one embodiment of the present invention.

FIG. 4 is a diagram of an array of pixels 402 that incorporates the read out circuit according to an embodiment of the present invention. Note that for each pixel of the array, such as pixel 406 of a bitline, the amplifier utilizes same common circuitry that includes current source 408, output transistor 410, and the pair of transistors 412 and 414 coupled in the current mirror configuration.

In the previous detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A read out circuit comprising:
   an amplifier having a first and second input devices, a pair of transistors and an output port, said first input device included in a pixel of an active pixel sensor array to receive an input signal indicative of an intensity of light detected by the pixel, the amplifier configured to generate at an output port thereof an output signal proportional to said input signal, said second input device disposed outside said pixel, wherein said first and second input devices and said pair of transistors form a differential pair.

2. The read out circuit of claim 1, said amplifier includes a voltage follower.

3. The read out circuit of claim 1, said first input active device includes a first input transistor.

4. The read out circuit of claim 3, said first input transistor includes a source follower.

5. The read out circuit of claim 1, said differential pair forms a differential amplifier.

6. The read out circuit of claim 5, said differential amplifier including a second input active device that has an input port thereof coupled to said output port.

7. The read out circuit of claim 1, said pixel including a select device, coupled to said first input active device, to select said pixel for read out when a select signal is asserted to said select device.

8. The read out circuit of claim 1, said pixel including a photodiode to receive light thereon and generate an electrical signal proportional to an intensity of said light.

9. The read out circuit of claim 1, said pixel including a photogate to receive light and generate an electrical signal proportional to an intensity of said light.

10. The read out circuit of claim 1, said active pixel sensor array includes a Complementary Metal Oxide Semiconductor (CMOS) active pixel sensor array.

11. The read out circuit of claim 1, said active pixel sensor array includes a plurality of rows and columns, each pixel of a column coupled to said amplifier.

12. An active pixel sensor array comprising:

at least one pixel including an amplifier to receive an input signal indicative of an intensity of light detected by the pixel; the amplifier configured to generate at an output port thereof an output signal proportional to the input signal, said amplifier having a first input device and a second input device, and a pair of transistors, wherein said first and second input devices and said pair of transistors form a differential pair, said first input device disposed within said at least one pixel, said second input device disposed outside said at least one pixel.

13. The active pixel sensor array of claim 12, said amplifier includes a voltage follower.

14. The active pixel sensor array of claim 12, said first input active device includes a first input transistor.

15. The active pixel sensor array of claim 14, said first input transistor includes a source follower.

16. The active pixel sensor array of claim 12, said differential pair forms a differential amplifier.

17. The active pixel sensor array of claim 16, said differential amplifier including a second input active device that has an input port thereof coupled to said output port.

18. The active pixel sensor array of claim 12, said pixel including a select device, coupled to said first input active device, to select said pixel for read out when a select signal is asserted to said select device.

19. The active pixel sensor array of claim 12, said pixel including a photodiode to receive light thereon and generate an electrical signal proportional to an intensity of said light.

20. The active pixel sensor array of claim 12, said pixel including a photogate to receive light and generate an electrical signal proportional to an intensity of said light.

21. The active pixel sensor array of claim 12, said active pixel sensor array includes a Complementary Metal Oxide Semiconductor (CMOS) active pixel sensor array.

22. The active pixel sensor array of claim 12, said active pixel sensor array includes a plurality of rows and columns, each pixel of a column coupled to said amplifier.

23. An imaging system comprising:

an active pixel sensor array that includes at least one pixel including an amplifier to receive an input signal indicative of an intensity of light detected by the pixel, the amplifier configured to generate at an output port thereof an output signal proportional to the input signal, said amplifier including a first and second active device, and a pair of transistors, said first input device disposed within said at least one pixel, said second input device disposed outside said at least one pixel;

a controller device coupled to the active pixel; and a post processing device coupled to the active sensor array, wherein said first and second input devices and said pair of transistors form a differential pair.

* * * * *